US006584376B1

(12) United States Patent
Van Kommer

(10) Patent No.: US 6,584,376 B1
(45) Date of Patent: Jun. 24, 2003

(54) MOBILE ROBOT AND METHOD FOR CONTROLLING A MOBILE ROBOT

(75) Inventor: Robert Van Kommer, Villars-sur-Glane (CH)

(73) Assignee: Swisscom Ltd., Berne (CH)

( * ) Notice: Subject to any disclaimer, the term of this patent is extended or adjusted under 35 U.S.C. 154(b) by 0 days.

(21) Appl. No.: 09/651,315

(22) Filed: Aug. 31, 2000

Related U.S. Application Data
(60) Provisional application No. 60/151,757, filed on Aug. 31, 1999.

(30) Foreign Application Priority Data
Nov. 30, 1999 (EP) .............................................. 99811103

(51) Int. Cl.[7] .............................................. G06F 19/00
(52) U.S. Cl. .................... 700/245; 700/257; 379/88.03; 379/90.01; 901/1
(58) Field of Search ............................... 700/245, 257; 379/90.01, 37, 42, 88.03, 354, 355, 355.06, 88.01; 434/118, 309, 319, 393; 340/521, 522, 531, 539; 901/1; 455/563, 564; 704/246, 251, 270, 275

(56) References Cited

U.S. PATENT DOCUMENTS

| | | | |
|---|---|---|---|
| 4,829,554 A | * 5/1989 | Barnes et al. ................ | 455/422 |
| 5,222,121 A | * 6/1993 | Shimada ................... | 379/88.03 |
| 5,446,445 A | * 8/1995 | Bloomfield et al. ......... | 340/521 |
| 5,519,809 A | * 5/1996 | Husseiny et al. ............ | 704/275 |
| 5,610,818 A | * 3/1997 | Ackroyd et al. .......... | 356/141.1 |
| 5,721,537 A | * 2/1998 | Protas .......................... | 340/7.1 |
| 6,032,038 A | * 2/2000 | Schroderus et al. ......... | 455/405 |
| 6,141,563 A | * 10/2000 | Miller et al. ............ | 379/357.01 |
| 6,154,658 A | * 11/2000 | Caci ............................. | 455/466 |
| 6,155,835 A | * 12/2000 | Shercliff ..................... | 438/118 |
| 6,161,012 A | * 12/2000 | Fenton et al. ................ | 455/432 |
| 6,169,890 B1 | * 1/2001 | Vatanen .................. | 379/357.01 |

FOREIGN PATENT DOCUMENTS

DE 196 24 680 A1 1/1998

OTHER PUBLICATIONS

Alda, Integrated Vision, Speech, & Action, 1994, Interpretation, pp. 1–2.*
Mizoguchi et al., Human–robot collaboration in teh smart office environment, 1999, Integrated, pp. 79–84.*
Theobalt et al., Talking to Godot: Dialogue with a mobile robot, no date, Internet, pp. 1–6.*
Suomela et al., Novel interactive control interface for centaurplike service robot, no date, Internet, pp. 1–10.*
Sobh et al., Cas studies in web–controlled devices and remote manipulation, 2001, Internet, see entire document.*
Lee et al., Human and robot integrated teleoperation, 1998, IEEE, pp. 1213–1218.*
Singh et al., Design and development of voice/tele operated intelligent mobile robot, 1997, IEEE, pp. 177–180.*
Yamamoto et al., A request of the robot: An experiment with the human–robot interactive system HuRis, 1992, IEEE, pp. 204–209.*

(List continued on next page.)

Primary Examiner—William A. Cuchlinski, Jr.
Assistant Examiner—McDieunel Marc
(74) Attorney, Agent, or Firm—Pillsbury Winthrop LLP

(57) ABSTRACT

A mobile robot includes an autonomous displacement device, a microphone, a loudspeaker, a mobile telephone module, and a voice analysis module able to interpret voice commands through the mobile telephone module to control the displacements of the mobile robot. The microphone is connected to the voice analysis module and thus also enables a human operator within earshot of the mobile robot to control the displacements of the mobile robot through voice commands.

12 Claims, 2 Drawing Sheets

OTHER PUBLICATIONS

Mital et al., A voice-activated robot with artificial intelligence, 1991, IEEE, pp. 904–909.*

Bradley et al., Automated symmetric grasping integrated with voice command control, 1990, Internet/IEEE, pp. 106–108.*

Leng et al., A robotic systme with AI, 1989, Internet/IEEE, pp. 999–1002.*

Aramaki et al., Voice command robot system by using the linguistic knowledge of a voice, 1989, Internet/IEEE, pp. 504–508.*

* cited by examiner

MOBILE ROBOT AND METHOD FOR CONTROLLING A MOBILE ROBOT

CROSS REFERENCE TO RELATED APPLICATIONS

This application claims the priority of the provisional application US60/151,757 filed on Aug. 31, 1999 and of European application EP99811103.3, the contents of which are hereby incorporated by reference.

FIELD OF THE INVENTION

The present invention concerns a mobile robot, in particular a mobile robot constituted by a telephone able to move autonomously.

RELATED ART

Mobile robots able to move autonomously under the control of a processing unit reacting to signals supplied by one or several sensors are already known. For example, robots provided with one or several cameras, a radar, microphones etc. and able to move in a complex environment and fulfill a mission have already been realized.

Robots that are remote-controlled by means of a wireless radio system are also known. The remote control generally uses a proprietary interface developed specifically for this application; no other communication is expected on the radio channel reserved for the control of the robot. The robot thus does not verify the identity of the operator attempting to control it.

Mobile robots controlled through the internet have also appeared. In this case, standard authentication and security procedures, for example by means of passwords and firewalls, have to be used to prevent non-authorized persons from controlling the robot.

Mobile robots controlled by voice commands are also known and are used for example, although not exclusively, in the entertainment and toy industry. These robots are able to analyze vocal commands of a nearby operator and to obey these commands. Certain mobile robots also include a voice synthesis module allowing them to generate voice responses reproduced through a loudspeaker.

An aim of the present invention is to propose a new type of mobile robot and a new method for controlling a mobile robot.

In particular, an aim of the present invention is to propose a new type of mobile robot and a new method for controlling a mobile robot offering more flexibility for controlling the mobile robot.

BRIEF SUMMARY OF THE INVENTION

According to the invention, these aims are achieved by means of a mobile robot comprising autonomous displacement means, a microphone, a loudspeaker, a mobile telecommunication module and a voice analysis module able to interpret voice commands received through said mobile telecommunication module for controlling the displacements of said mobile robot.

These aims are furthermore achieved by means of a remote control method comprising the following steps:
1. establishing a connection with the mobile robot through a commuted telephone network,
2. sending through said connection the voice commands for displacing the robot,
3. interpreting said voice commands in said mobile robot for controlling the displacements of said mobile robot.

Preferred embodiments are moreover described in the dependent claims and in the description given as example.

The claimed robot has the advantage of being voice-controlled either by a nearby human operator, through the integrated microphone, or by a distant operator, through a telecommunications network, for example through a public mobile telecommunications network (GSM or UMTS for example).

Furthermore, it allows a voice communication to be established through a mobile network between a human operator near the mobile robot and a distant operator connected to any point of the telecommunications network through conventional telephone equipment.

The invention furthermore makes it possible to realize a mobile telecommunications network comprising at least a mobile node constituted by a mobile robot, in which the position of the mobile nodes can be controlled by means of voice commands sent from any node of the network and analyzed in said mobile nodes.

In an variant embodiment of the invention, the mobile robot is also provided with at least one camera and visual reproduction means, for example a screen, as well as with a cellular phone of the third generation allowing the transmission of images and multimedia data. This embodiment extends the communication possibilities through image processing technologies.

BRIEF DESCRIPTION OF THE DRAWINGS

The invention will be better understood by reference to the detailed description of a preferred embodiment illustrated by the attached drawings in which.

DETAILED DESCRIPTION OF THE INVENTION

Figure 1:
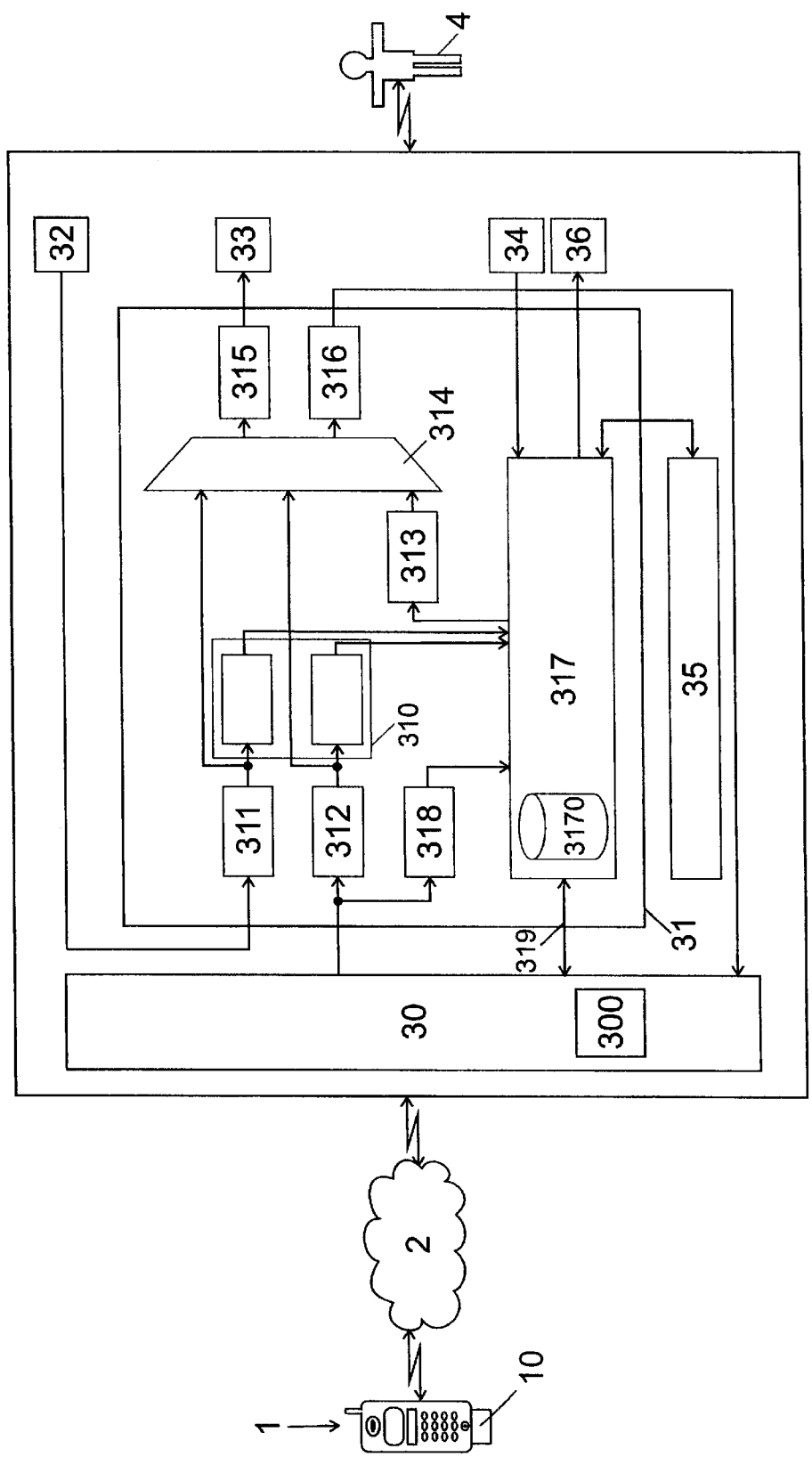
FIG. 1 shows a schematized representation of a communication system comprising a mobile robot according to the invention.

FIG. 1 illustrates an embodiment of a mobile robot 3 that can be controlled through a mobile telecommunications network 2. "Mobile robot" in the context of the following description and claims should be understood as a robot provided with autonomous displacement means 35, for example wheels, and with a processing unit 31, for example a micro-processor, micro-controller or computer able to execute a program to control the robot's functions, notably its displacements, according to signals sent by one or several sensors on the robot and/or to high-level commands sent to the robot by an operator. The present invention applies in particular to "small" robots, i.e. to robots of a size smaller than the human operator.

The robot illustrated in FIG. 1 comprises a displacement module 35, for example an electric motor, driving the wheels (not represented) and controlled by the processing unit 31. The whole robot is self-powered by an autonomous electric supply, for example an accumulator or photo-voltaic panel.

A computer program stored in a memory zone (not represented) of the processing unit 31 enables all of the robot's functions to be controlled. This program is preferably written in an object-oriented language, for example C++, IDL of CORBA or JAVA (registered mark of SUN Micro-systems), but can also comprise modules written in an iterative language or by programming a neuronal network.

The robot 3 includes furthermore a microphone 32 and other sensors 34, for example a camera, a touch sensor, an accelerometer, a radar, biometrics sensors etc., which allow it to perceive its environment.

A loudspeaker 33 as well as reproducing means 36, for example a display screen, enable it to communicate with this environment, notably with a human operator 4 near the robot.

According to the invention, the mobile robot comprises a mobile telecommunication module 30 that enables it to connect into a public telephone network 2, for example a network of the type GSM, AMPS, TDMA, CDMA, TACS, PDC, HSCSD, GPRS, EDGE or UMTS, or in a third generation network (3G), for example using WAP (Wireless Application Protocol) technology, or also in a fixed network into which the module connects via a wireless interface of the type DECT for example. The module 30 allows it to establish a bidirectional voice or audio-visual communication ("full-duplex") with any terminal device 1 connected to the telecommunications network 2.

In a preferred embodiment, the interface 30 is constituted by a conventional mobile phone integrated in the mobile robot. The mobile phone comprises preferably a subscriber identification module 300, for example a removable SIM card, which enables the mobile robot to be identified within the mobile telecommunications network 2. In a first embodiment, the mobile phone 30 can be provided with keying means, for example a keyboard, and with a display, so that the human operator 4 can use the mobile robot 3 to telephone as with a conventional mobile phone. In another embodiment, the mobile phone 30 is without keying means and/or display.

The processing unit 31 comprises a module 311 for shaping the signal of the microphone 32; the module 311 can for example comprise an amplifier, a filter and an analog-numeric converter at 8 KHz for example. Another module 312 can shape the voice signal supplied by the interface 30. In the case where the interface 30 supplies an analog voice signal, the module 312 will comprise for example an amplifier, a filter and an analog-numeric converter at 8 KHz for example; in the case of an interface 30 supplying a numeric signal, the module 312 can include a data format conversion module.

The shaped signals of the microphone 32 and of the mobile phone 30 are supplied at the input of a multiplexer 314 and of a voice analysis module 310. The voice analysis module 310 can for example use a neural network, hidden Markov networks or a hybrid system, and is trained to recognize voice commands intended for the robot in the voice flux coming from the microphone 32 and the mobile phone 30. In the case of a mobile robot that can be controlled by a large number of potential operators, the voice analysis module is as far as possible trained by means of voice samples from a representative operator sample of the population of all operators. In the case of a robot controlled by a single operator 1 or 4, the voice analysis module can then be trained to analyze that operator's voice, for example during a training stage ("speaker-dependant recognition").

The commands decoded by the voice analysis module 310 are supplied at the input of a sequential machine 317, comprising preferably a computer program stored in a memory zone and a processor able to execute this computer program. The sequential machine 317 also receives signals directly from the mobile phone 30 through a CIT (Computer Integrated Telephone) interface 319, for example a conventional TAPI interface that enables the sequential machine 317 to control the mobile phone 31, notably to establish or interrupt a communication, obtain the caller's identification etc. The state of the sequential machine 317 can furthermore depend on signals supplied by the other sensors 34 and by the displacement module 35.

The state of the sequential machine 317 determines the value of the control signals supplied by this machine, notably a control signal of the multiplexer 314, control signals of the displacement module 35, control signals of the telephone interface 30, control signals of a voice synthesizer 313 and control signals of the reproduction organs 35, for example a display 36.

The voice synthesizer 313 controlled by the sequential machine 317 makes it possible to generate voice responses to the queries and voice commands of the human operator 4 or to those received through the mobile network 2. The generated voice announcements can also depend on the state of the sequential machine 317, the voice synthesizer being thus able itself to announce a particular state of the mobile robot, for example an alarm or a detected event.

The multiplexer 314 controlled by the sequential machine 317 allows the output signal supplied to the loudspeaker 33 and the output signal supplied at the voice input of the mobile phone 30 to be selected. According to the control signal of the sequential machine 317, the multiplexer 314 supplies to each of these two exits either the signal coming from the microphone 32 or the signal received by the mobile phone 30, or the signal generated by the voice synthesizer 313.

A shaping module 315 enables the output signal of the multi-plexer to be adapted for it to be reproduced by means of the loudspeaker 33. This module 315 can for example comprise a numeric-analog converter and an amplifier. Similarly, a module 316 can shape the output signal of the multiplexer intended for the mobile phone 30.

The processing unit 31 preferably comprises furthermore a caller verification module 318, which allows the identity of the caller 1 to be verified on the basis of the characteristics of the caller's voice. The result supplied by the unit 31 is provided to the sequential machine 317. The module 31, in a not represented embodiment, can also be used to verify the identity of the human operator 4 near the mobile robot 3.

The processing unit preferably comprises furthermore a users data bank 3170 in which the profile of the operators 1, 41, 4 of the mobile robot are stored. This profile includes preferably for each operator the access rights, described further below, preferences, for example the language and/or the command syntax, the expertise level etc., voice parameters facilitating voice recognition, one or several addresses (for example the telephone number, internet address) at which the operator can or wishes to be contacted, etc.

The mobile robot 3 can furthermore comprise means (not represented) for downloading data, for example a modem receiving the flux of data coming from the mobile phone 30 and allowing the control program to be modified in the sequential machine 317.

Figure 2:
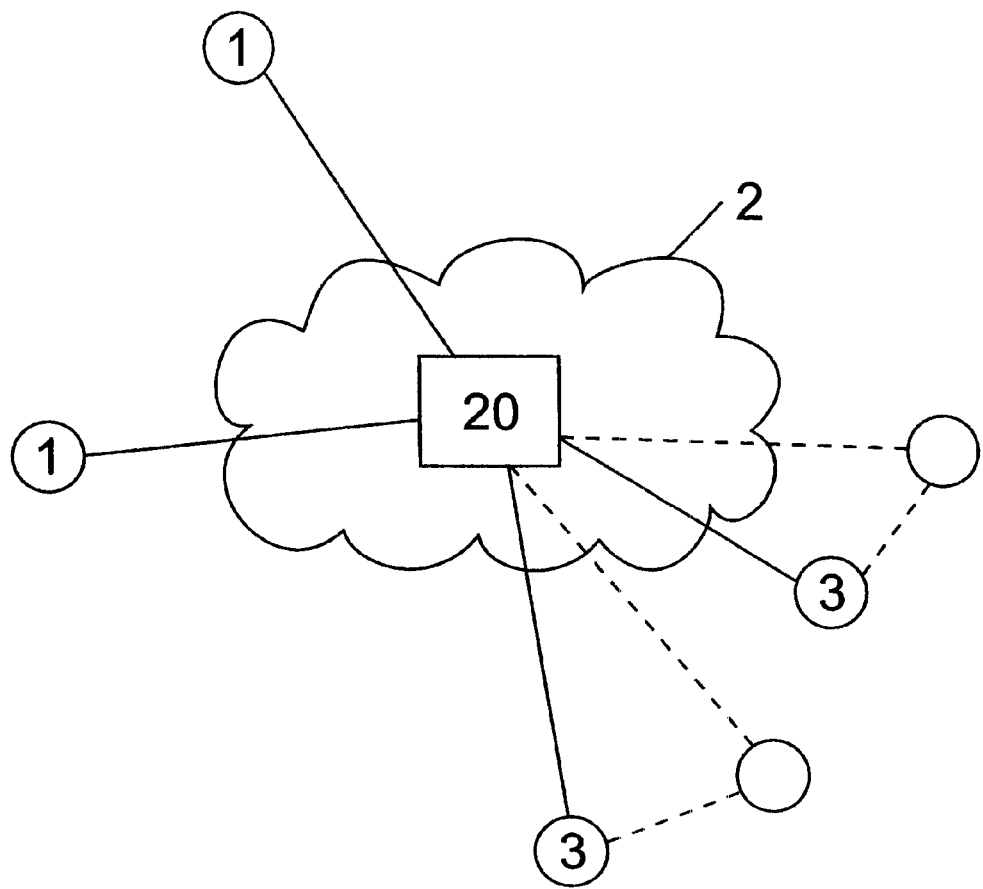
FIG. 2 shows a schematized representation of a mobile telecommunications network comprising mobile nodes according to the present invention.

FIG. 2 illustrates an example of mobile network 2 comprising a plurality of mobile robots 3 according to the invention. The mobile network includes one or several switches 20 to which a plurality of mobile subscribers 1 and a plurality of mobile robots 3 can connect. The position of each of the nodes 3 of the mobile network can be controlled by means of voice commands transmitted from any node 1 or 3 of the mobile network 2 and analyzed in said mobile nodes. Each operator connected by a node 1, 3 of the mobile network 2 is thus able to control the mobile robot 3, provided the necessary authorization has been granted, and can establish a voice communication with a human operator near the mobile robot 3.

According to various embodiments of the invention, the interface 30 can be completed or modified so as to allow the transmission of e-mails, of SMS (Short Message System), of images etc. The interface 30 can also comprise a client internet, enabling the mobile robot to connect into a mobile TCP/IP network 2. This embodiment makes it notably possible for the mobile robot 3 to access different types of services via internet and to be controlled by means of commands transmitted via internet, notably by means of voice commands transmitted through internet.

The mobile robot 3 can also comprise a FTP or http server (not represented) allowing any distant operator 1, even any internet user, to check through a simple client FTP or http, for example by means of an internet navigator, the state of the mobile robot 3, notably the state of the sequential machine 317 and the signals supplied by the sensors 34, and to control the mobile robot through this channel.

When the mobile robot is provided with a camera 34 and a video screen 35, a video conference can be established between any distant operator 1, 3 and a human operator in the field of vision of the camera 34.

The one skilled in the art will understand that the different elements and modules of the mobile robot 3 illustrated in FIG. 1 can be realized either as an electronic circuit or as software.

Different application possibilities of the mobile robot 3 described here above will now be described in more detail.

To control it, an operator 1 must first establish a connection with the mobile robot 3, for example by composing the telephone number corresponding to the identification module 300 in the case of a telephone type network 2. In the case of a packet network, the distant operator 1 must send the data bundles at the mobile robot's address.

The users data bank 3170 indicates for each user, including for unknown or anonymous users, the rights and privileges. Each operator 1, 4 can be given several types of rights, for example the right to displace the robot, the right to communicate with the robot's environment etc.; these rights can for example be stored in the users data bank 3170. A particular operator 1, 4 preferably receives the right to administer the robot, notably to update its software, to grant other rights etc., whereas the other operators can receive different other types of rights.

The data bank 3170 preferably comprises at least the identity of one operator authorized to displace the mobile robot and to establish a bi-directional communication with the mobile robot's environment and, optionally, one or several identities of operators having more limited rights, for example only the right to establish a bidirectional communication.

In order to verify the operator's rights and privileges, it is necessary to determine his or her identity. In a simple embodiment, this identity is determined simply by using the caller recognition functions of the GSM or UMTS systems. The caller identification forwarded to the telephone 30 is communicated by the TAPI interface 319 to the processing unit 31 and compared with the identities stored in the data bank 3170 to determine the calling operator's rights. This solution only makes it possible to verify the terminal used to establish the connection with the called mobile robot 3 but not the caller's identity to be determined in the case where the same terminal is used by several callers.

In another embodiment, this identity is determined and/or verified by means of a password, for example by means of a PIN code introduced through the keys of the telephone 1 (DTMF system) or uttered vocally.

In another embodiment, this identity is determined and/or verified by means of the caller's biometrics parameters, preferably by means of the characteristics of the caller's voice determined by the caller verification module 318, or of the characteristics of the caller's face or eyes in the case of an image transmission system.

In another embodiment, this identity is verified by means of an electronic signature of a digital message sent by the calling operator 1 and which can be signed by means of an electronic certificate stored in an identification module 10 of the terminal used by the calling operator.

These different embodiments can also be combined and the mobile robot can for example request an uttered password and a correspondence of the vocal signature obtained from this password.

An authorized distant operator 1 can then control the robot's displacements and actions by means of predefined voice commands, preferably by means of high-level commands such as "forward", "left", "stop", "return to station", "seize object" etc. The mobile robot 3 executes the orders received and sends confirmations, preferably in the form of voice messages generated by the voice synthesizer 313.

The distant operator 1 can put the robot in conversation mode by uttering an appropriate voice command, for example "conversation mode". In this case, the multiplexer 314 is controlled so as to connect directly the mobile phone 30 with the microphone/loudspeaker compound 32–33 and thus to allow a voice and/or audiovisual dialogue between the distant operator 1 and a nearby operator 4. The mobile robot then returns to command mode when a corresponding command ("escape sequence") is detected by the module 310, for example when the distant operator 1 utters "command mode".

In the case of a mobile robot provided with a camera or other sensors 34, the conversation mode can imply the transmission by the mobile phone 30 of images or other signals determined by the mobile robot.

The command mode can for example be distinguished very easily from the conversation mode by beginning each command by a specific sequence, for example "Please do", followed by a specific command.

The mobile robot can also be controlled by the nearby operator 4, by means of voice commands received by the microphone 32. The conflicts arising from contradictory commands received from the distant operator 1 and the nearby operator 4 are arbitrated by the sequential machine 317 on the basis of the indications contained in the users data bank 3170.

Hereafter, as an example, is a typical dialogue between a distant operator 1 and a mobile robot used as majordomo to meet guests in a building:

1. The distant operator 1 selects the telephone number of the mobile robot 3. The first exchange of the dialogue is used to verify the identity and privileges of the distant operator 1, for example a mobile subscriber. For this purpose, the mobile robot invites the distant operator 1 to give his password. The semantic contents of the password as well as the voice signature determined by the module 318 from this response is used to verify the caller's rights.
2. The distant operator orders the mobile robot to move towards the building's entrance and to wait for a visitor expected at 9 o'clock, Mr John Smith.

3. The robot automatically moves towards the building's entrance.

4. At 9 o'clock, the visitor arrives and is met by the mobile robot 3.

5. The mobile robot 3 calls the distant operator 1 to report Mr Smith's arrival.

6. The distant operator 1 switches to communication mode to greet Mr Smith through the loudspeaker 33 of the mobile robot and to ask him the purpose of his visit.

7. Mr Smith states that he wishes to visit the research center. His answer is conveyed to the distant operator through the micro-phone 32 and the mobile telecommunications network 2.

8. The distant operator 1 returns to command mode and orders the mobile robot to lead Mr Smith to the research center.

9. The mobile robot confirms the performance of this order.

When the global cost decreases, other possible applications of the mobile robot can comprise:

Virtual animals, used for example as toys, inhabited by a human voice that can be anonymous or not.

Robots that will allow the remote visiting of exhibitions, museums, historical sites etc. and will enable communication with persons or robots at the same location.

Games or competitions that make it possible to include many participants through mobile phones, for example football games for robots, discovery games etc.

Robots that permit distant learning with the possibility of interactive communication with the other participants or robots.

Robots that make it possible to shop at a distance. The robot calls its operator only in case of difficulties; it enables the distant operator 1 to communicate with a nearby vendor 4.

Robots used for home automation applications, for example for the surveillance of flats, and that can be questioned at a distance by their owners.

Help for elderly or handicapped persons.

Etc.

What is claimed is:

1. A mobile robot comprising:

means for autonomous displacement;

a microphone;

a loudspeaker;

a mobile telecommunication module; and a voice analysis module configured to interpret voice commands received through said mobile telecommunication module in order to control displacements of said mobile robot configured to verify an identity of an operator, wherein said identity is verified through a password given by the operator.

2. A mobile robot comprising:

means for autonomous displacement;

a microphone;

a loudspeaker;

a mobile telecommunication module;

a voice analysis module configured to interpret voice commands received through said mobile telecommunication module in order to control displacements of said mobile robot configured to verify an identity of an operator; and a users data bank indicating rights and privileges of operators of the mobile robot.

3. A mobile robot according to claim 2, wherein said data bank makes it possible to distinguish between the operators that have a right to displace the robot and those that can only establish a bi-directional communication with an environment of the mobile robot.

4. A method for the remote controlling of a mobile robot, comprising the following steps:

establishing a connection with the mobile robot through a commuted telephone network; sending voice commands for displacing the robot through said connection;

interpreting said voice commands in said mobile robot to control displacements of said mobile robot; and sending a command for switching to communication mode in order to establish a communication with an operator near said mobile robot.

5. A mobile telecommunications network comprising mobile nodes, wherein a position of at least certain nodes is controllable through voice commands transmitted from any node in the network and analyzed within said certain mobile nodes.

6. A mobile robot comprising:

means for autonomous displacement;

a microphone;

a loudspeaker;

a mobile telecommunication module; and a voice analysis module configured to interpret voice commands received through said mobile telecommunication module in order to control displacements of said mobile robot, wherein said microphone is connected to said voice analysis module, enabling a human operator within earshot of said mobile to control the displacements of said mobile robot through voice commands, and wherein a bidirectional voice telephone communication can be established between a human operator within earshot of said mobile robot and a user connected through a mobile telecommunications network.

7. A mobile robot configured to distinguish between commands for displacing the mobile robot and voice commands intended to be retransmitted to an operator, said mobile robot comprising:

means for autonomous displacement;

a microphone;

a loudspeaker;

a mobile telecommunication module; and voice analysis module configured to interpret voice commands received through said mobile telecommunication module in order to control displacements of said mobile robot, wherein said microphone is connected to said voice analysis module, enabling a human operator within earshot of said mobile to control the displacements of said mobile robot through voice commands, and wherein a bi-directional voice telephone communication can be established between a human operator within earshot of said mobile robot and a user connected through a mobile telecommunications network.

8. A mobile robot comprising:

means for autonomous displacement;

a microphone;

a loudspeaker;

a mobile telecommunication module; and a voice analysis module configured to interpret voice commands received through said mobile telecommunication module in order to control displacements of said mobile robot, and one or several sensors enabling said mobile robot to perceive an environment of said mobile robot, wherein at least one of said sensors is constituted by a camera.

9. A mobile robot configured to verify an identity of an operator, said mobile robot comprising:

means for autonomous displacement;

a microphone;

a loudspeaker;

a mobile telecommunication module; and a voice analysis module configured to interpret voice commands received through said mobile telecommunication module in order to control displacements of said mobile robot, wherein said identity is verified through an electronic signature of the operator.

10. A mobile robot configured to verify an identity of an operator, said mobile robot comprising:

means for autonomous displacement;

a microphone;

a loudspeaker;

a mobile telecommunication module; and a voice analysis module configured to interpret voice commands received through said mobile telecommunication module in order to control displacements of said mobile robot, wherein said identity is verified through biometrics characteristics of the operator.

11. A mobile robot configured to verify an identity of an operator, said mobile robot comprising:

means for autonomous displacement;

a microphone;

a loudspeaker;

a mobile telecommunication module; and a voice analysis module configured to interpret voice commands received through said mobile telecommunication module in order to control displacements of said mobile robot, wherein said identity is verified through biometrics characteristics of the operator, and said biometrics characteristics comprise characteristics taken from the a voice of the operator.

12. A mobile robot configured to verify an identity of an operator, said mobile robot comprising:

means for autonomous displacement;

a microphone;

a loudspeaker;

a mobile telecommunication module; and a voice analysis module configured to interpret voice commands received through said mobile telecommunication module in order to control displacements of said mobile robot, wherein said identity is verified through biometrics characteristics of the operator, and said biometrics characteristics comprise characteristics taken from a voice of the operator and visual characteristics of the operator.

* * * * *